United States Patent
Sander et al.

(10) Patent No.: US 10,266,159 B2
(45) Date of Patent: Apr. 23, 2019

(54) VEHICLE BRAKING ARRANGEMENT

(71) Applicants: Ulrich Sander, Göteborg (SE); Christian Svenson, Vårgårda (SE)

(72) Inventors: Ulrich Sander, Göteborg (SE); Christian Svenson, Vårgårda (SE)

(73) Assignee: VEONEER SWEDEN AB, Vargarda (SE)

(*) Notice: Subject to any disclaimer, the term of this patent is extended or adjusted under 35 U.S.C. 154(b) by 13 days.

(21) Appl. No.: 15/124,233

(22) PCT Filed: Mar. 5, 2015

(86) PCT No.: PCT/SE2015/050247
§ 371 (c)(1),
(2) Date: Sep. 7, 2016

(87) PCT Pub. No.: WO2015/137863
PCT Pub. Date: Sep. 17, 2015

(65) Prior Publication Data
US 2017/0015287 A1  Jan. 19, 2017

(30) Foreign Application Priority Data
Mar. 11, 2014 (EP) .................................... 14158729

(51) Int. Cl.
*B60T 8/60* (2006.01)
*B60T 1/14* (2006.01)
(Continued)

(52) U.S. Cl.
CPC ............... *B60T 1/14* (2013.01); *B60T 1/12* (2013.01); *B60T 8/56* (2013.01); *B60T 8/58* (2013.01);
(Continued)

(58) Field of Classification Search
CPC ........................................................ B60T 1/14
(Continued)

(56) References Cited

U.S. PATENT DOCUMENTS

2005/0001479 A1* 1/2005 Watanabe ................ B60T 1/14
303/139
2009/0150034 A1 6/2009 Toshiki et al.
(Continued)

FOREIGN PATENT DOCUMENTS

DE           2901035 A1     7/1980
DE     102005009949 A1     9/2006
(Continued)

OTHER PUBLICATIONS

Machine translation of DE 102010014932 (no date).*
Machine translation of EP 2311695 (no date).*
PCT International Search Report dated Jun. 30, 2015.

*Primary Examiner* — Nicholas J Lane
(74) *Attorney, Agent, or Firm* — Brinks Gilson & Lione

(57) ABSTRACT

The present invention relates to a vehicle braking arrangement for a vehicle with wheels contacting the ground during normal running. The vehicle braking arrangement includes an emergency brake control unit, a first emergency braking system including non-reversible braking means arranged to operate independently of the vehicle wheels, at least one acceleration detector, and a wheel brake anti-locking system. The emergency brake control unit is arranged to input acceleration data (a) when the wheel brake anti-locking system is active, and to calculate the coefficient of friction ($\mu$) between the wheels and the ground. The emergency brake control unit is arranged to determine if the first emergency braking system should be activated in dependence of a first plurality of parameters, where one of these parameters is the coefficient of friction ($\mu$).

8 Claims, 4 Drawing Sheets

(51) Int. Cl.
  *B60T 1/12*     (2006.01)
  *B60T 8/56*     (2006.01)
  *B60T 13/46*    (2006.01)
  *F16D 63/00*    (2006.01)
  *B60T 8/58*     (2006.01)

(52) U.S. Cl.
  CPC .............. *B60T 13/46* (2013.01); *F16D 63/00* (2013.01); *B60T 2210/12* (2013.01); *B60T 2270/10* (2013.01)

(58) Field of Classification Search
  USPC .......................................................... 188/5
  See application file for complete search history.

(56) References Cited

U.S. PATENT DOCUMENTS

2010/0036565 A1    2/2010  Werner et al.
2011/0198161 A1*   8/2011  Lomazzo ................ B60T 1/14
                                                      188/5

FOREIGN PATENT DOCUMENTS

DE    102010014932 A1 * 10/2011    ............... B60T 1/14
FR        2923790 A1    5/2009

* cited by examiner

VEHICLE BRAKING ARRANGEMENT

CROSS REFERENCE TO RELATED APPLICATIONS

This application claims priority to European Patent Application No. 14158729.5, filed on Mar. 11, 2014 and PCT/SE2015/050247, filed on Mar. 5, 2015.

FIELD OF THE INVENTION

The present invention relates to a vehicle braking arrangement for a vehicle with wheels which are adapted to be in contact with the ground during normal running. The vehicle braking arrangement includes an emergency brake control unit, a first emergency braking system including non-reversible braking means which is arranged to operate independently of the vehicle wheels, at least one acceleration detector, and a wheel brake anti-locking system.

The present invention also relates to a method for determining if a first emergency braking system with non-reversible braking means at a vehicle should be activated. The vehicle has wheels which are adapted to be in contact with the ground during normal running. The first emergency braking system operates independently of the vehicle wheels when activated.

BACKGROUND

In many traffic situations it is desired to acquire an enhanced braking effect, for example at possible collision situations and when the road grip is lost, by means of an auxiliary braking arrangement. One example of such an auxiliary braking arrangement is described in EP 2311695, where a braking mat is pressed against the road by at least one airbag in a chamber Another example is disclosed in U.S. Pat. No. 8,356,685, where a braking plate may be lowered. When lowered, it is pressed against the road due to a lowered pressure in a vacuum chamber in the braking plate.

It is however important to reach a correct decision regarding if and when to activate such an auxiliary braking arrangement, since it is not reversible, affects the traffic situation and subjects the persons in the vehicle to increased forces due to the increased deceleration. In EP 2311695, it is for example mentioned that it is detected whether the ABS (Anti-lock Braking System) is activated or not.

SUMMARY

In an exemplary embodiment, an object of the present invention is to provide an enhanced emergency braking arrangement where it is determined when a non-reversible braking means, which operates independently of the vehicle wheels, should be activated.

In one embodiment, said object is achieved by means of a vehicle braking arrangement for a vehicle with wheels which are adapted to be in contact with the ground during normal running. The vehicle braking arrangement includes an emergency brake control unit, a first emergency braking system including non-reversible braking means which is arranged to operate independently of the vehicle wheels, at least one acceleration detector, and a wheel brake anti-locking system.

The emergency brake control unit is arranged to input vehicle acceleration data from said acceleration detector when the wheel brake anti-locking system is active, and to calculate the coefficient of friction between the wheels and the ground. The coefficient of friction is calculated as acceleration data divided by the gravitational acceleration. The emergency brake control unit is arranged to determine if the first emergency braking system should be activated in dependence of a first plurality of parameters, and where one of these parameters is the said coefficient of friction.

In one embodiment, said object is also achieved by means of a method for determining if a first emergency braking system with non-reversible braking means at a vehicle should be activated. The vehicle has wheels which are adapted to be in contact with the ground during normal running. The first emergency braking system operates independently of the vehicle wheels when activated.

In an exemplary embodiment, the method includes:
  inputting vehicle acceleration data during use of a wheel brake anti-locking system;
  calculating a coefficient of friction between the wheels and the ground by dividing said acceleration data by the gravitational acceleration; and
  using said coefficient of friction when determining if the first emergency braking system should be activated.

According to an example, the vehicle braking arrangement includes a second emergency braking system, for example a brake assist system, that is arranged to automatically perform braking such that the wheel brake anti-locking system is kept activated.

According to another example, the emergency brake control unit is arranged to determine if the second emergency braking system should be activated in dependence of a second plurality of parameters.

According to another example, the first emergency braking system includes a braking plate that is arranged to be lowered from a rest position to a braking position. The braking plate includes a sealing rim, running circumferentially and being arranged to at least partially contact the ground in the braking position, such that an at least partially enclosed volume is formed between the braking plate, the sealing rim and the ground. In the braking position, the pressure is lowered in the volume such that the braking plate is pressed against the ground by a conferred pressure difference between air outside the at least partially enclosed volume and air in the at least partially enclosed volume. In this way, a retaining force between the braking plate and the ground is obtained.

Other examples are evident from the dependent claims disclosed herein.

A number of advantages may be obtained by means of the present disclosure. Mainly, an enhanced determination is provided for when a non-reversible braking means, which operates independently of the vehicle wheels, should be activated.

BRIEF DESCRIPTION OF THE DRAWINGS

The present invention will now be described more in detail with reference to the appended drawings, where.

DETAILED DESCRIPTION

Figure 1:
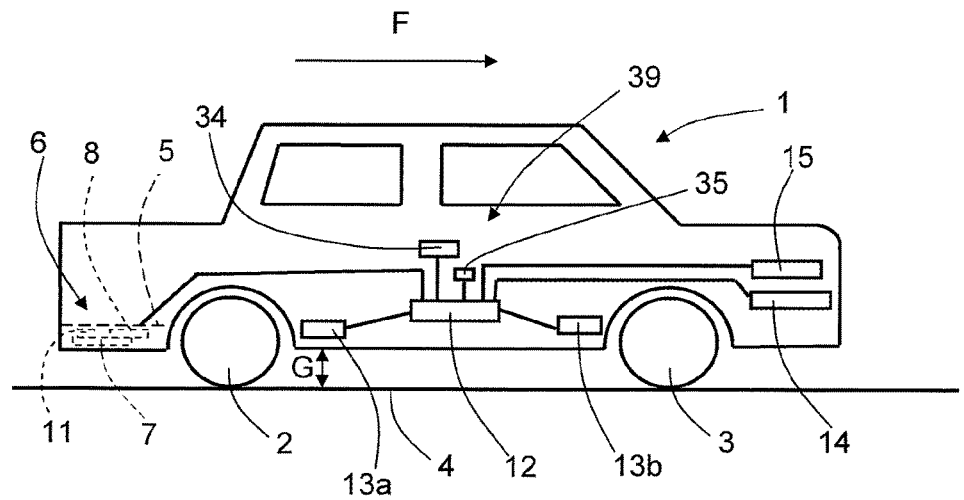
FIG. 1 shows a schematic side view of a vehicle during normal running in accordance with an exemplary embodiment.

With reference to FIG. 1, showing a side view of a vehicle 1, where the vehicle 1 includes wheels 2, 3 which are in contact with the ground 4 during normal running. Here, the vehicle 1 is assumed to be running in a forward direction F. At the rear of the vehicle 1, attached to a bottom floor 5, a first emergency braking system 6 is arranged and is shown in its rest position. The first emergency braking system 6 includes a braking plate 7 that is arranged to be lowered if it is determined to be needed, for example in order to avoid a collision, the braking plate 7 being connected to the vehicle 1 by means of a linkage arrangement 8. The vehicle 1 includes an emergency brake control unit 12 that is arranged to control the first emergency braking system 6.

Figure 2:
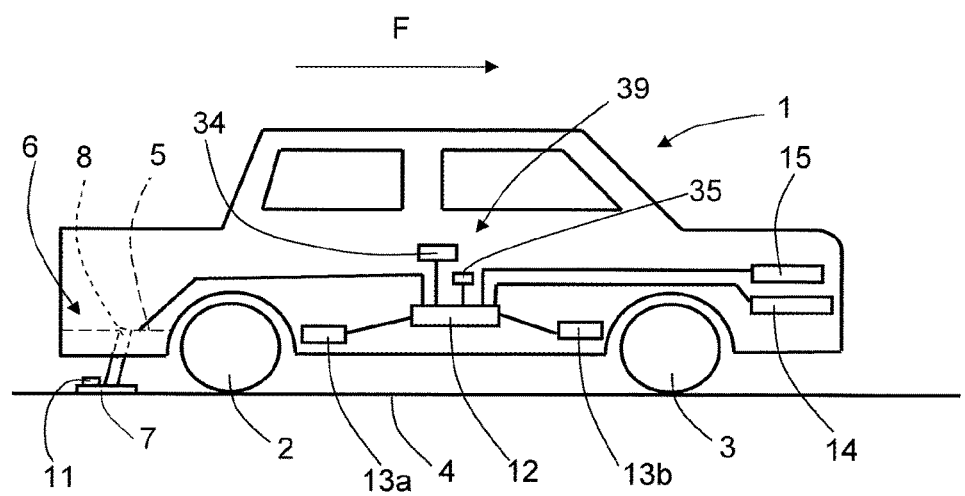
FIG. 2 shows a schematic side view of a vehicle with a first emergency braking arrangement in braking position in accordance with an exemplary embodiment.
Figure 3:
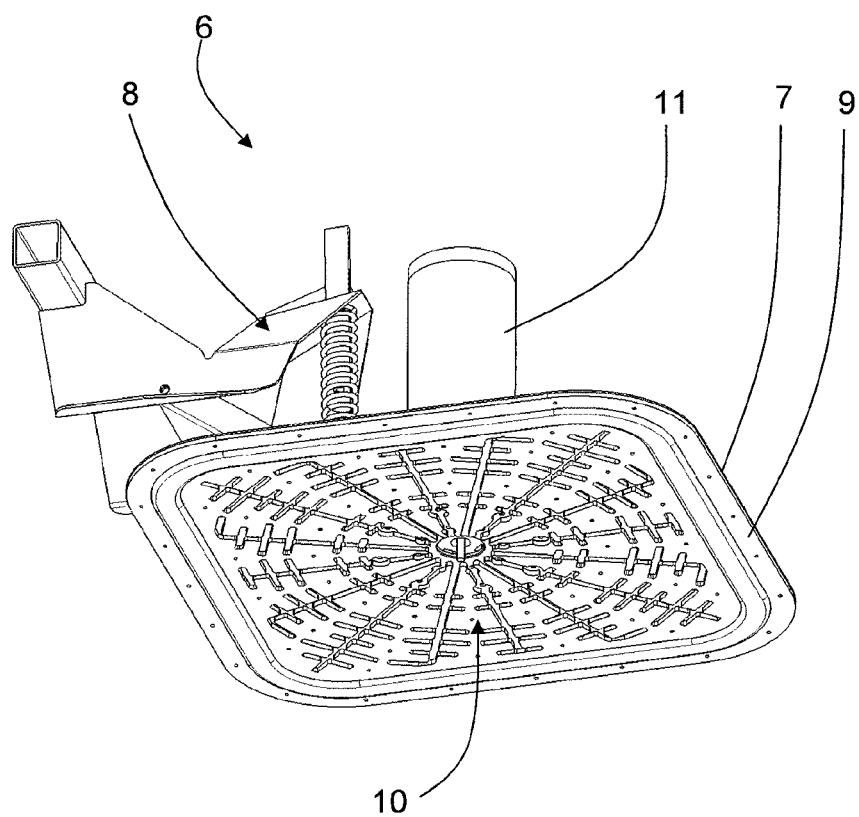
FIG. 3 shows a perspective bottom view of a first emergency braking arrangement in accordance with an exemplary embodiment.

In FIG. 2, the first emergency braking system 6 is shown with the braking plate 7 in the braking position, and in FIG. 3, first emergency braking system 6 with the braking plate 7 is seen in a perspective view from below. In the braking position, the braking plate 7 has rapidly been displaced such that a circumferentially running sealing rim 9 of the braking plate 7 is in contact with the ground 4. An at least partially enclosed volume 10 is formed between the braking plate 7, the sealing rim 9 and the ground 4 when the braking plate 7 is in the braking position.

The pressure is lowered in the volume 10 such that the braking plate 7 is pressed against the ground 4 by a conferred pressure difference between air outside the volume 10 and air in the volume 10, such that a retaining force between the braking plate 7 and the ground 4 is obtained. The pressure may be lowered in many ways, in this example there is a low pressure container 11 attached to the braking plate 7.

The first emergency braking system 6 is non-reversible, which means that when it has been activated, it cannot be easily removed and neutralized, although the vehicle should be able to drive home or to a workshop when the first emergency braking system 6 has been activated, a so called "limp-home" functionality. Furthermore, the first emergency braking system 6 is very efficient and when activated, the occupants in the vehicle 1 in question are subject to a relatively high deceleration. Therefore, it is desired to determine when the first emergency braking system 6 should be activated with a high degree of accuracy.

The vehicle further includes an ABS (Antilock Braking System) 13a, 13b. When the ABS 13a, 13b is active and working, the wheels 2, 3 are at the limit of adhesion to the ground 4.

In a possible scenario, the emergency brake control unit 12 is fed with input data from, for example a camera 14 and a radar arrangement 15. From these inputs, the emergency brake control 12 unit estimates whether there is a possibility of collision with an object. If there is a possibility of collision with an object, the possibility of avoidance by means of ordinary braking and/or steering is evaluated. As long as avoidance by means of ordinary braking and steering is possible, the emergency brake control unit 12 takes no further action. At this moment, the ABS 13a, 13b may be activated by the driver.

However, when avoidance by means of ordinary braking and steering is no longer possible, the emergency brake control unit may initiate a second emergency braking system 34 that acts on at least one wheel. In this example, a brake assist system keeps the braking at such a level that the ABS 13a, 13b is kept active.

According to an exemplary embodiment, the present acceleration (a) is detected and measured by at least one acceleration detector 35, and when the ABS 13a, 13b is active, the emergency brake control unit 12 is arranged to input vehicle acceleration data (a) from said acceleration detector 35. Said acceleration detector 35 is arranged in the vehicle and connected to the emergency brake control unit 12.

The emergency brake control unit 12 is further arranged to calculate the coefficient of friction ($\mu$) between the wheels 2, 3 and the ground 4 as the acceleration a divided by the gravitational acceleration (g) that is about 9.81 m/s$^2$–9.82 m/s$^2$. The calculation may also be expressed by means of maximum (x) and (y) forces in a so-called Kammscher circle divided by the normal force.

The fact that the ABS 13a, 13b is active and working, the wheels 2, 3 being on or at the limit of adhesion to the ground 4, means that the acceleration (a) divided by the gravitational acceleration (g) at that moment is a very good approximation of the present coefficient of friction ($\mu$).

Having acquired the present coefficient of friction ($\mu$), together with other sensor inputs regarding a possible collision, the emergency brake control unit 12 is able to determine the possibility of whether braking of the wheels 2, 3 alone will be sufficient to avoid a collision, together with possible steering avoidance action.

As long as the emergency brake control unit 12 determines that braking of the wheels 2, 3 alone will be sufficient to avoid a collision, based on the acquired present coefficient of friction ($\mu$), together with possible steering avoidance action, no further actions are taken, and the second emergency braking system 34 is maintained active.

Should the emergency brake control unit determine that the risk of collision has fallen below a certain threshold, the second emergency braking system 34 is de-activated, and full control of the vehicle 1 might be returned to the driver.

Should the emergency brake control unit determine that braking of the wheels alone, together with possible steering avoidance action, will not be sufficient to avoid a collision based on the acquired present coefficient of friction ($\mu$), the first emergency braking system is activated, and in this example this means that the braking plate is lowered and that the pressure in the volume is lowered such that a retaining force is provided as discussed above.

Figure 4:
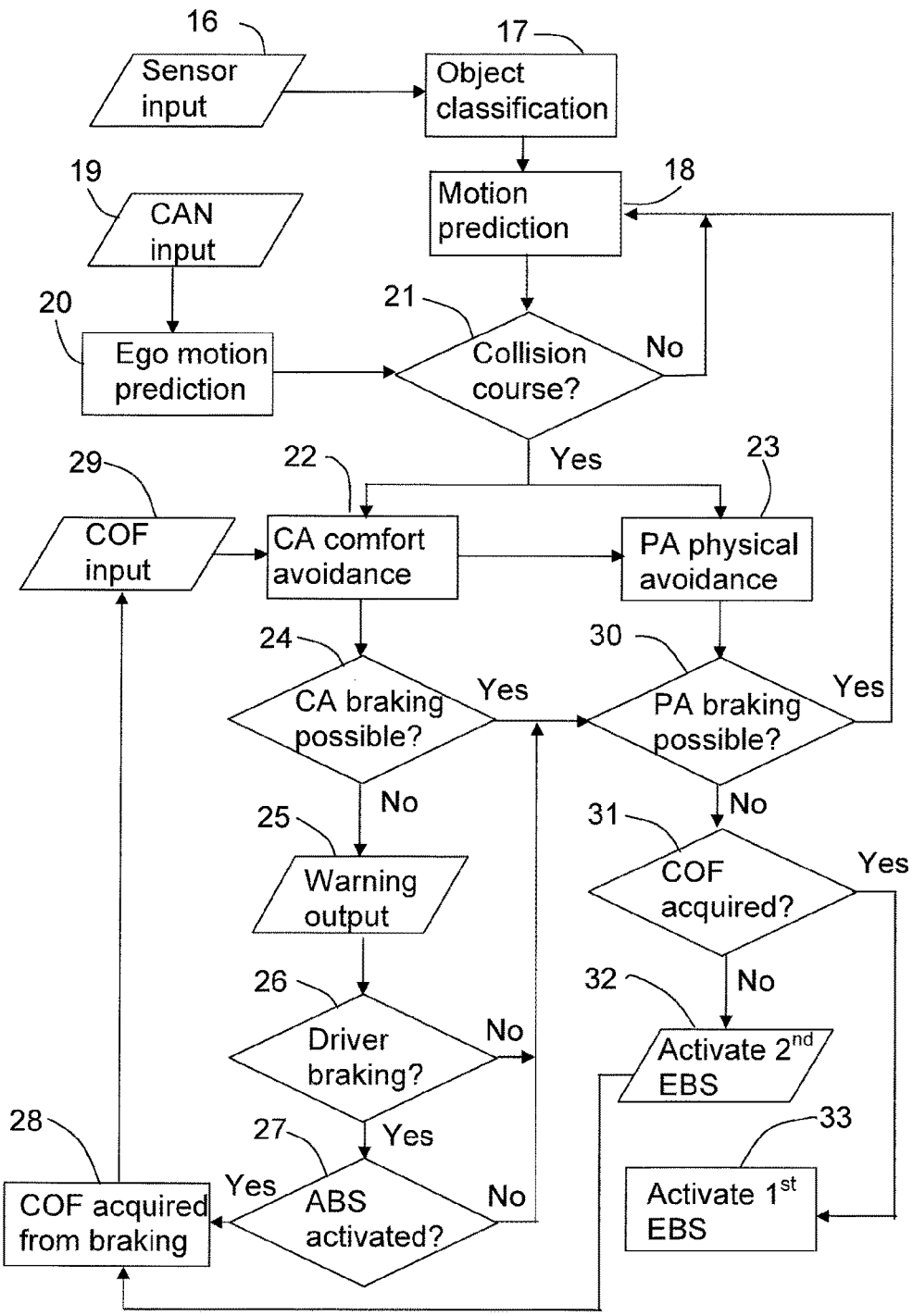
FIG. 4 shows a flow-chart of an example of an emergency braking process.

The above is illustrated more in detail below as a process with reference to the flow diagram in FIG. 4. The flow diagram is processed in the emergency brake control unit 12.

Sensor input 16 from the sensors such as said radar 14 and camera 15, are used for motion prediction 18 and object classification 17, respectively, and motion prediction 18 of possible objects detected by said sensors 14, 15. CAN (Control Area Network) input 19 from the vehicle's other systems is used for motion prediction of the own vehicle 1. Examples of other sensor input are warnings via GPS (Global Positioning System), warnings from stationary roadside sensors or sensors in other vehicles. Generally, the sensors 14, 15 are arranged for scanning at least a part of the environment outside the vehicle 1.

From the acquired inputs, a first decision 21 regarding if a collision course is present or not has to be taken. If no, the process is returned to motion prediction 18. If yes, the process is divided into two branches, comfort avoidance (CA) 22 and physical avoidance (PA) 23.

Comfort avoidance means that the object in question is kept outside a certain comfort limit that runs a certain distance away from the physical limits of the vehicle 1. Physical avoidance means that the object in question is kept outside the physical limits of the vehicle 1.

In the comfort avoidance branch, a second decision 24 is taken regarding if comfort avoidance by means of braking and/or steering is possible. If no, the process is moved to the physical avoidance branch, where a third decision 30 is taken regarding if physical avoidance by means of braking and/or steering is possible. If yes at the second decision 24, a warning 25 is output to the driver.

Next, a fourth decision 26 is taken regarding if the driver is braking or not. If no, the process is moved to the physical avoidance branch, where the third decision 30 is taken regarding if physical avoidance by means of braking and/or steering is possible. If yes at the fourth decision 26, a fifth decision 27 is taken regarding if the ABS 13*a*, 13*b* is activated or not. If no, the process is moved to the physical avoidance branch, where the third decision 30 is taken regarding if physical avoidance by means of braking and/or steering is possible. If yes at the fifth decision 27, the coefficient of friction $\mu$ (COF) is acquired 28 by measuring the acceleration (a) and calculating the coefficient of friction ($\mu$) as described above.

Next, the acquired coefficient of friction ($\mu$) is input 29 into the comfort avoidance branch 22 and the physical avoidance branch 23. At the physical avoidance branch, the third decision 30 is taken regarding if physical avoidance by means of braking and/or steering is possible. If yes, the process is returned to motion prediction 18, and thus comfort avoidance is sufficient. If no at the third decision 30, a sixth decision 31 is taken regarding if the coefficient of friction ($\mu$) has been acquired previously, i.e. if the coefficient of friction ($\mu$) has been used in the third decision 30.

If yes, it is determined that physical avoidance is not possible, taking the present coefficient of friction ($\mu$) into account, and then the first emergency braking system 6 is activated. If no at the sixth decision 31, the second emergency braking system (EBS) 34 is activated, keeping the braking at such a level that the ABS 13*a*, 13*b* is kept active. Then it is possible to acquire 28 the coefficient of friction ($\mu$) by measuring the acceleration (a) and calculating the coefficient of friction ($\mu$) as described above, and then inputting 29 the acquired coefficient of friction ($\mu$) into the comfort avoidance branch 22 and the physical avoidance branch 23.

Since probably physical avoidance by means of braking and/or steering is not possible at this stage, the third decision 30 leads to the sixth decision 31, and since the coefficient of friction ($\mu$) has been acquired and used in the third decision 30, the first emergency braking system (EBS) 6 is activated.

Should the physical avoidance by means of braking and/or steering be considered possible at the third decision 30, the process is returned to motion prediction 18, and thus comfort avoidance is sufficient.

The first emergency braking system 6 does not have to be of the kind described, but may generally be constituted by and/or include any type of non-reversible braking means, which operates independently of the vehicle wheels 2, 3. An example may be a movable, or an expandable, beam under the vehicle, which, when moved to the ground 4, or expanded towards the ground, applies a pressure against the ground and executes a braking function by means of friction ($\mu$) between the beam and the ground.

The second emergency braking system 34 is of any suitable kind that works by automatically performing braking such that the ABS 13*a*, 13*b* is kept activated, for example in the form of a brake assist system.

Figure 5:
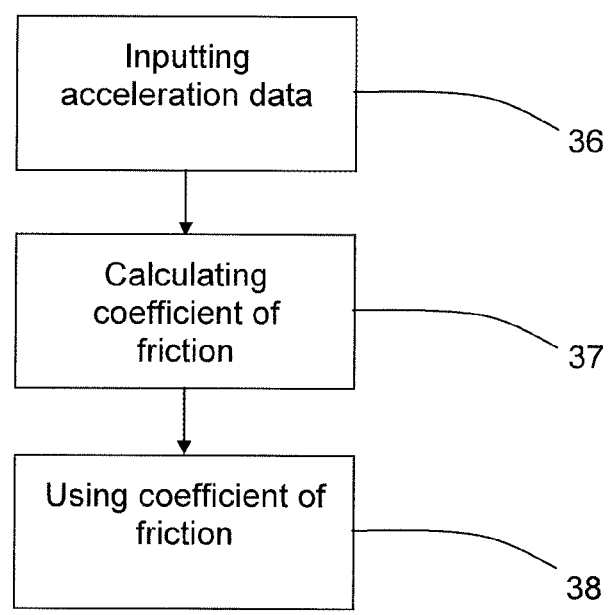
FIG. 5 shows a flow-chart for a method in accordance with an exemplary embodiment.

With reference to FIG. 5, an exemplary embodiment includes a method for determining if a first emergency braking system 6 with non-reversible braking means 7 at a vehicle 1 should be activated, where the vehicle has wheels 2, 3 which are adapted to be in contact with the ground 4 during normal running method. The method includes:

at 36: Inputting vehicle acceleration data a during use of a wheel brake anti-locking system 13*a*, 13*b*.

at 37: Calculating a coefficient of friction ($\mu$) between the wheels 2, 3 and the ground 4 by dividing said acceleration data (a) by the gravitational acceleration (g).

at 38: Using said coefficient of friction ($\mu$) when determining if the first emergency braking system 6 should be activated.

The embodiments disclosed herein are not limited to the examples above, but may vary freely within the scope of the appended claims. The second emergency braking system 34 is shown connected to the emergency brake control unit 12, but may be connected to the wheel brakes or the ABS 13*a*, 13*b* directly.

The ABS is only an example, any type of wheel brake anti-locking system may be used.

The second emergency braking system 34 is not necessary for the various embodiments disclosed herein in order to acquire the coefficient of friction ($\mu$), it is only needed that the ABS is activated. However, when activated, the second emergency braking system 34 ensures that the ABS is activated such that the coefficient of friction ($\mu$) may be calculated from an acceleration measurement.

The emergency brake control unit 12 may be constituted by one or several units.

Generally, the emergency brake control unit 12 is arranged to determine if the first emergency braking system 6 should be activated in dependence of a first plurality of parameters, and where one of these parameters is the said coefficient of friction ($\mu$). The emergency brake control unit 12 is further arranged to determine if the second emergency braking system 6 should be activated in dependence of a second plurality of parameters. One, many, or all, of the parameters in the first plurality of parameters and the second plurality of parameters may be constituted by the same parameter or parameters. An example of parameters that are included in at least one of the first plurality of parameters and the second plurality of parameters may be constituted by input data from sensors such as the camera 14 and the radar arrangement 15.

The components that have been discussed above as involved in braking and/or emergency braking are all included in a vehicle braking arrangement 39 as indicated in FIG. 1 and FIG. 2. Examples of these components are the emergency brake control unit 12, the first emergency braking system 6, said acceleration detector 35, the wheel brake anti-locking system 13*a*, 13*b*, the second emergency braking system 34 and the sensors 14, 15 which are arranged for scanning at least a part of the environment outside the vehicle 1.

While the above description constitutes the preferred embodiment of the present invention, it will be appreciated that the invention is susceptible to modification, variation and change without departing from the proper scope of the fair meaning of the accompanying claims.

The invention claimed is:

1. A vehicle braking arrangement for a vehicle with wheels that are adapted to be in contact with the ground during normal running, where the vehicle braking arrangement comprises: an emergency brake control unit, a first emergency braking system comprising non-reversible braking means that is arranged to operate independently of the vehicle wheels, at least one acceleration detector, and a wheel brake anti-locking system, wherein the emergency brake control unit is arranged to input vehicle acceleration data (a) from the acceleration detector when the wheel brake anti-locking system is active, and to calculate a coefficient of friction (µ) between the wheels and the ground as the acceleration data (a) divided by the gravitational acceleration (g), wherein the emergency brake control unit further is arranged to determine if the first emergency braking system should be activated in dependence of a first plurality of parameters, and where one of the first plurality of parameters is the coefficient of friction (µ), wherein the vehicle braking arrangement comprises a second emergency braking system that is arranged to automatically perform braking such that the wheel brake anti-locking system is kept activated.

2. The vehicle braking arrangement according to claim 1, wherein the second emergency braking system is constituted by a brake assist system.

3. The vehicle braking arrangement according to claim 1, wherein the emergency brake control unit further is configured to determine if the second emergency braking system should be activated in dependence of a second plurality of parameters.

4. The vehicle braking arrangement according to claim 3, wherein the vehicle braking arrangement comprises sensors arranged for scanning at least a part of the environment outside the vehicle, where the emergency brake control unit is configured to input data from the sensors, the data being comprised in the parameters.

5. The vehicle braking arrangement according to claim 1, wherein the first emergency braking system comprises a braking plate that is arranged to be lowered from a rest position to a braking position, where the braking plate comprises a sealing rim, running circumferentially and being arranged to at least partially contact the ground in the braking position, such that an at least partially enclosed volume is formed between the braking plate, the sealing rim and the ground, wherein, in the braking position, pressure is lowered in the volume such that the braking plate is pressed against the ground by a conferred pressure difference between air outside the at least partially enclosed volume and air in the at least partially enclosed volume, such that a retaining force between the braking plate and the ground is obtained.

6. The vehicle comprising the vehicle braking arrangement according to claim 1.

7. A method for determining if a first emergency braking system with non-reversible braking means at a vehicle should be activated, wherein the vehicle has wheels that are adapted to be in contact with the ground during normal running, wherein the first emergency braking system operates independently of the vehicle wheels when activated, and wherein the method comprises the steps of:

inputting vehicle acceleration data (a) during use of a wheel brake anti-locking system;

calculating a coefficient of friction (µ) between the wheels and the ground by dividing the acceleration data (a) by the gravitational acceleration (g);

using the coefficient of friction (µ) when determining if the first emergency braking system should be activated, and using a second emergency braking system for automatically performing braking such that the wheel brake anti-locking system is kept activated.

8. The method according to claim 7, wherein the method comprises the steps of:

inputting data regarding at least a part of the environment outside the vehicle;

estimating whether there is a possibility of collision with an object using the inputted data; and using the estimation for determining whether an emergency braking system should be activated.

* * * * *